United States Patent
Kim et al.

(10) Patent No.: US 9,414,242 B2
(45) Date of Patent: Aug. 9, 2016

(54) METHOD AND DEVICE FOR MEASURING INTERFERENCE IN WIRELESS COMMUNICATION SYSTEM

(71) Applicant: LG ELECTRONICS INC., Seoul (KR)

(72) Inventors: Eunsun Kim, Anyang-si (KR); Hanbyul Seo, Anyang-si (KR); Byounghoon Kim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/391,360

(22) PCT Filed: Apr. 12, 2013

(86) PCT No.: PCT/KR2013/003080
§ 371 (c)(1),
(2) Date: Oct. 8, 2014

(87) PCT Pub. No.: WO2013/154382
PCT Pub. Date: Oct. 17, 2013

(65) Prior Publication Data
US 2015/0103683 A1  Apr. 16, 2015

Related U.S. Application Data

(60) Provisional application No. 61/623,550, filed on Apr. 12, 2012, provisional application No. 61/650,967, filed on May 23, 2012.

(51) Int. Cl.
*H04W 24/02*  (2009.01)
*H04L 1/00*  (2006.01)
(Continued)

(52) U.S. Cl.
CPC ............... *H04W 24/02* (2013.01); *H04L 1/00* (2013.01); *H04W 72/085* (2013.01); *H04L 5/005* (2013.01);
(Continued)

(58) Field of Classification Search
CPC . H04W 24/02; H04W 72/085; H04W 72/082; H04W 84/045; H04L 1/00; H04L 5/0023; H04L 5/005; H04L 5/0035
See application file for complete search history.

(56) References Cited

U.S. PATENT DOCUMENTS

2011/0267937 A1* 11/2011 Yoo ................ H04J 11/005
370/201
2012/0034926 A1  2/2012 Damnjanovic et al.
(Continued)

FOREIGN PATENT DOCUMENTS

WO  2012/018611  2/2012

OTHER PUBLICATIONS

KDDI, "Performance evaluations of the signaling schemes for transmission power information," 3GPP TSG RAN WG1 Meeting #68, R1-120673, Feb. 2012, 4 pages.
(Continued)

*Primary Examiner* — Ajay Cattungal
(74) *Attorney, Agent, or Firm* — Lee Hong Degerman Kang & Waimey; Jonathan Kang; Jeffrey Lotspeich

(57) ABSTRACT

An embodiment of the present invention relates to a method for measuring interference by a terminal in a wireless communication system and includes: receiving neighboring cell specific reference signal (CRS) information; performing CRS interference cancellation on the basis of the CRS information; and measuring interference by applying a correction value to the result of the CRS interference cancellation, wherein the correction value is set for each sub-frame set for limited measurement.

12 Claims, 12 Drawing Sheets

(51) Int. Cl.
*H04W 72/08* (2009.01)
*H04W 84/04* (2009.01)
*H04L 5/00* (2006.01)

(52) U.S. Cl.
CPC ............. *H04L 5/0023* (2013.01); *H04L 5/0035* (2013.01); *H04W 72/082* (2013.01); *H04W 84/045* (2013.01)

(56) References Cited

U.S. PATENT DOCUMENTS

| | | | |
|---|---|---|---|
| 2012/0082022 A1 | 4/2012 | Damnjanovic et al. | |
| 2013/0003788 A1* | 1/2013 | Marinier | H04B 7/024 375/219 |
| 2013/0208604 A1* | 8/2013 | Lee | H04L 25/0226 370/252 |
| 2013/0252626 A1* | 9/2013 | Lee | H04W 72/1231 455/452.1 |
| 2013/0322376 A1* | 12/2013 | Marinier | H04W 72/06 370/329 |
| 2014/0126512 A1* | 5/2014 | Kim | H04L 1/1822 370/329 |
| 2014/0177532 A1* | 6/2014 | Kim | H04W 52/42 370/328 |
| 2014/0254537 A1* | 9/2014 | Kim | H04J 11/005 370/329 |
| 2014/0269597 A1* | 9/2014 | Park | H04J 11/005 370/329 |

OTHER PUBLICATIONS

Samsung, "Views on signalling requirements for CRS interference handling," 3GPP TSG-RAN2 #77Bis meeting, Tdoc R2-121495, Mar. 2012, 4 pages.

PCT International Application No. PCT/KR2013/003080, Written Opinion of the International Searching Authority dated Aug. 21, 2013, 19 pages.

* cited by examiner

FIG. 5
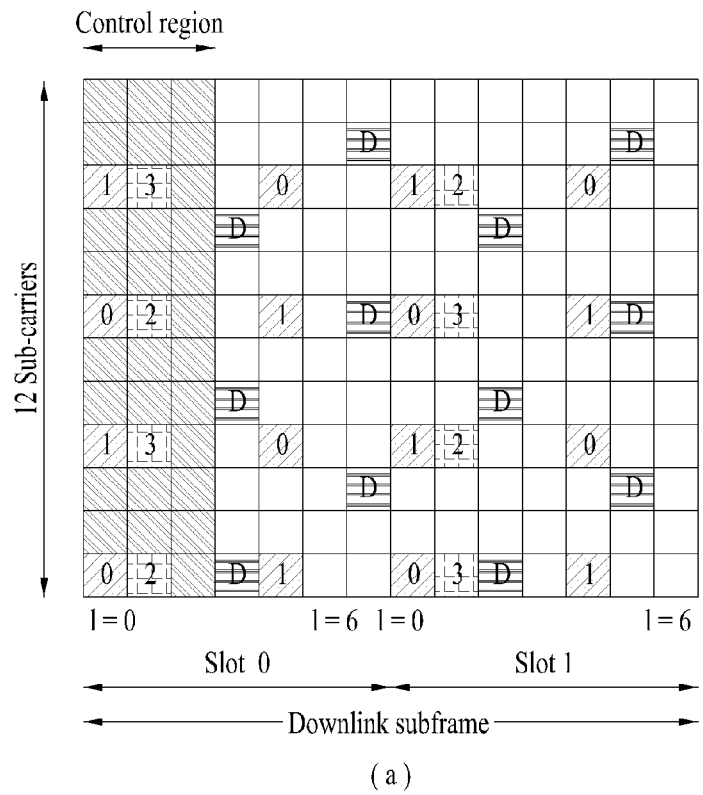
(a)
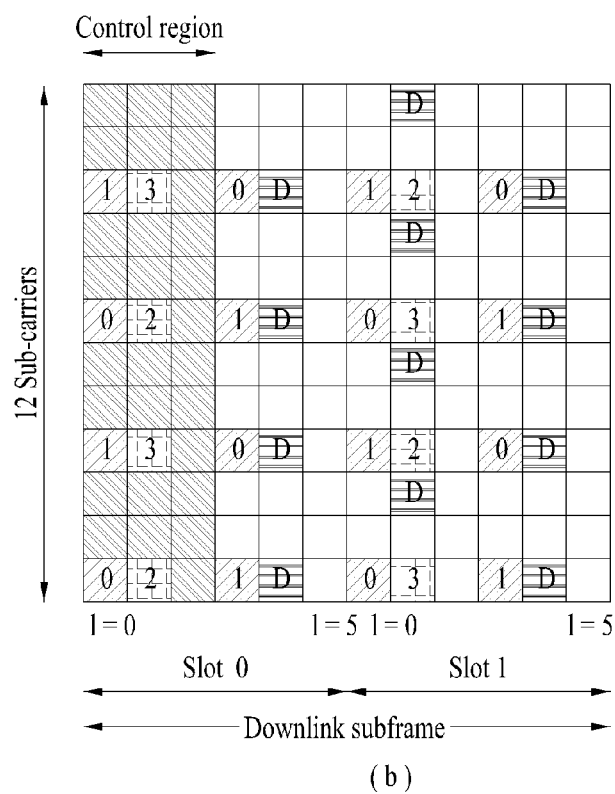
(b)

METHOD AND DEVICE FOR MEASURING INTERFERENCE IN WIRELESS COMMUNICATION SYSTEM

CROSS-REFERENCE TO RELATED APPLICATIONS

This application is the National Stage filing under 35 U.S.C. 371 of International Application No. PCT/KR2013/003080, filed on Apr. 12, 2013, which claims the benefit of U.S. Provisional Application Ser. No. 61/623,550, filed on Apr. 12, 2012 and 61/650,967, filed on May 23, 2012, the contents of which are all hereby incorporated by reference herein in their entirety.

TECHNICAL FIELD

The present invention relates to a method and apparatus for measuring interference due to a neighbor cell.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide to a method and apparatus for measuring interference in consideration of interference from a neighbor cell during interference measurement for channel state reporting.

An object of the present invention is to provide technologies related to neighbor cell measurement in a serious interference situation. It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method of measuring interference by a User Equipment (UE) in a wireless communication system, the method including receiving Cell Specific Reference Signal (CRS) information of a neighbor cell, performing CRS interference cancellation based on the CRS information, and applying a correction value to a result obtained by performing the CRS interference cancellation to measure interference, wherein the correction value is set for each subframe set for restricted measurement.

In another aspect of the present invention, provided herein is a User Equipment (UE) in a wireless communication system, the UE including a reception module, and a processor, wherein the processor receives Cell Specific Reference Signal (CRS) information of a neighbor cell, performs CRS interference cancellation based on the CRS information, and applies a correction value to a result obtained by performing the CRS interference cancellation to measure interference, and wherein the correction value is set for each subframe set for restricted measurement.

The following matters may be included in the $1^{st}$ and $2^{nd}$ technical aspects of the present invention.

The correction value may be a ratio of CRS Energy per Resource Element (EPRE) to Physical Downlink Shared Channel (PDSCH) EPRE.

A subframe set for the restricted measurement may include a first subframe set for Almost Blank Subframe (ABS) and a second subframe set for a normal subframe, and the correction value may include a first correction value for the first subframe set and a second correction value for the second subframe set.

The first correction value may be 0 and the second correction value may be 1.

The UE may assume that the second correction value is equal to the ratio of PDSCH EPRE to CRS EPRE of a serving cell of the UE.

The correction value may be contained in the CRS information and transmitted to the UE.

The CRS information may include an ABS configuration flag indicating whether or not a corresponding cell is a collaborative cell of a serving cell of the UE.

The ASB configuration flag may indicate ASB configuration is shared by the corresponding cell and the serving cell of the UE when the ABS configuration flag is 1, and the ASB configuration flag may indicate that the corresponding cell is not related to ABS configuration of the serving cell of the UE when the ABS configuration flag is 0.

The same correction value may be set for each subframe when the ABS configuration flag is 0.

A correction value for a subframe set related to ABS may be 0 and a correction value for a subframe set related to a normal frame may be 1, when the ABS configuration flag is 1.

The CRS information may include at least one of a cell identity (ID), the number of CRS ports, information of a frequency for transmission of CRS, and information of time for transmission of CRS.

The CRS information may be transferred through higher layer signaling.

Advantageous Effects

According to the present invention, interference measurement may be performed while more accurately reflecting an interference environment when restricted measurement or the like is configured.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

BEST MODE

Figure 1:
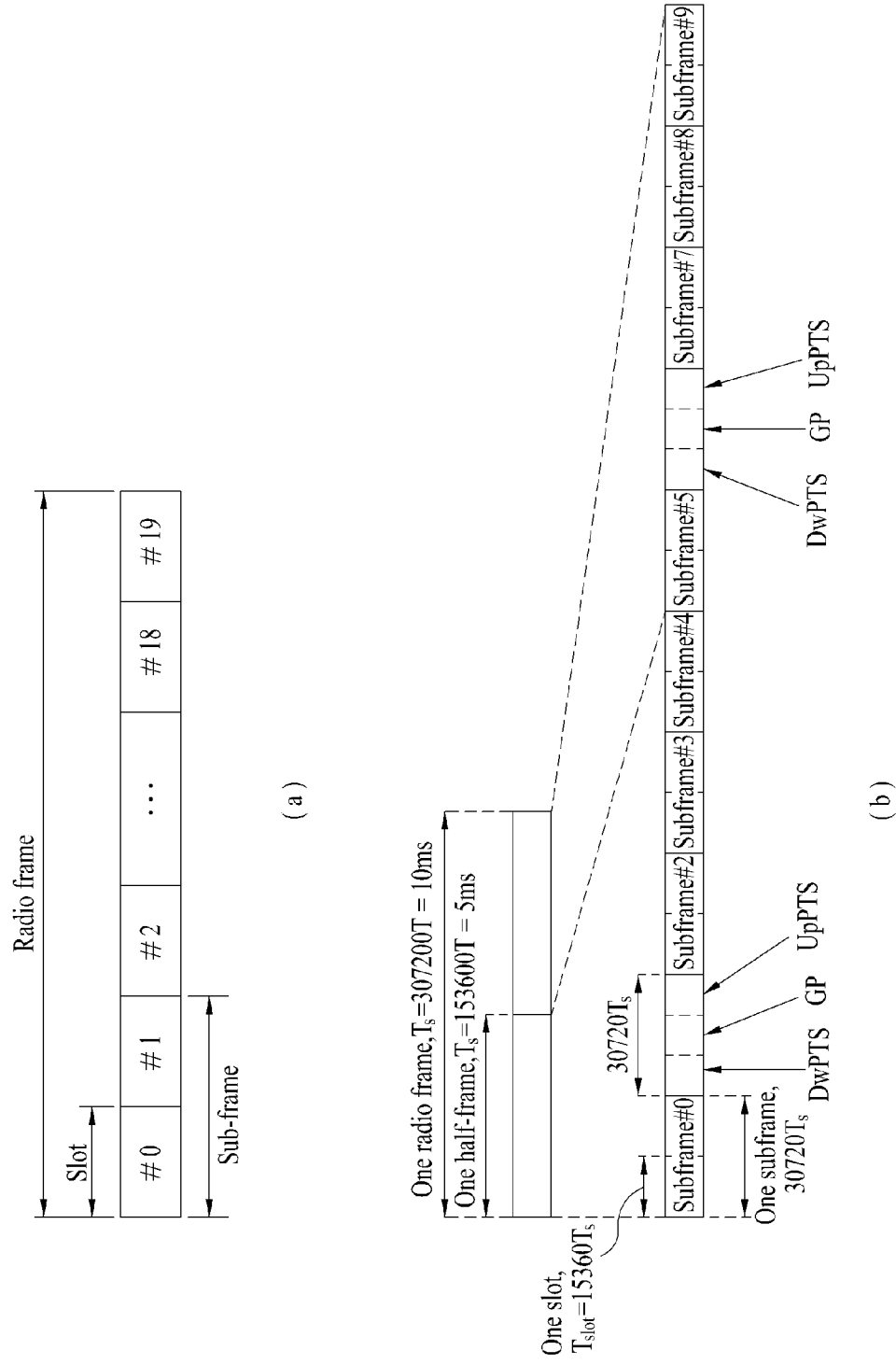
FIG. 1 exemplarily shows a radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

LTE/LTE-A Resource Structure/Channel

FIG. 1 exemplarily shows a radio frame structure.

The structure of a radio frame in 3GPP LTE system will be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A radio frame includes 10 subframes, and one subframe includes two slots in the time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called an SC-FDMA symbol or a symbol duration. An RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
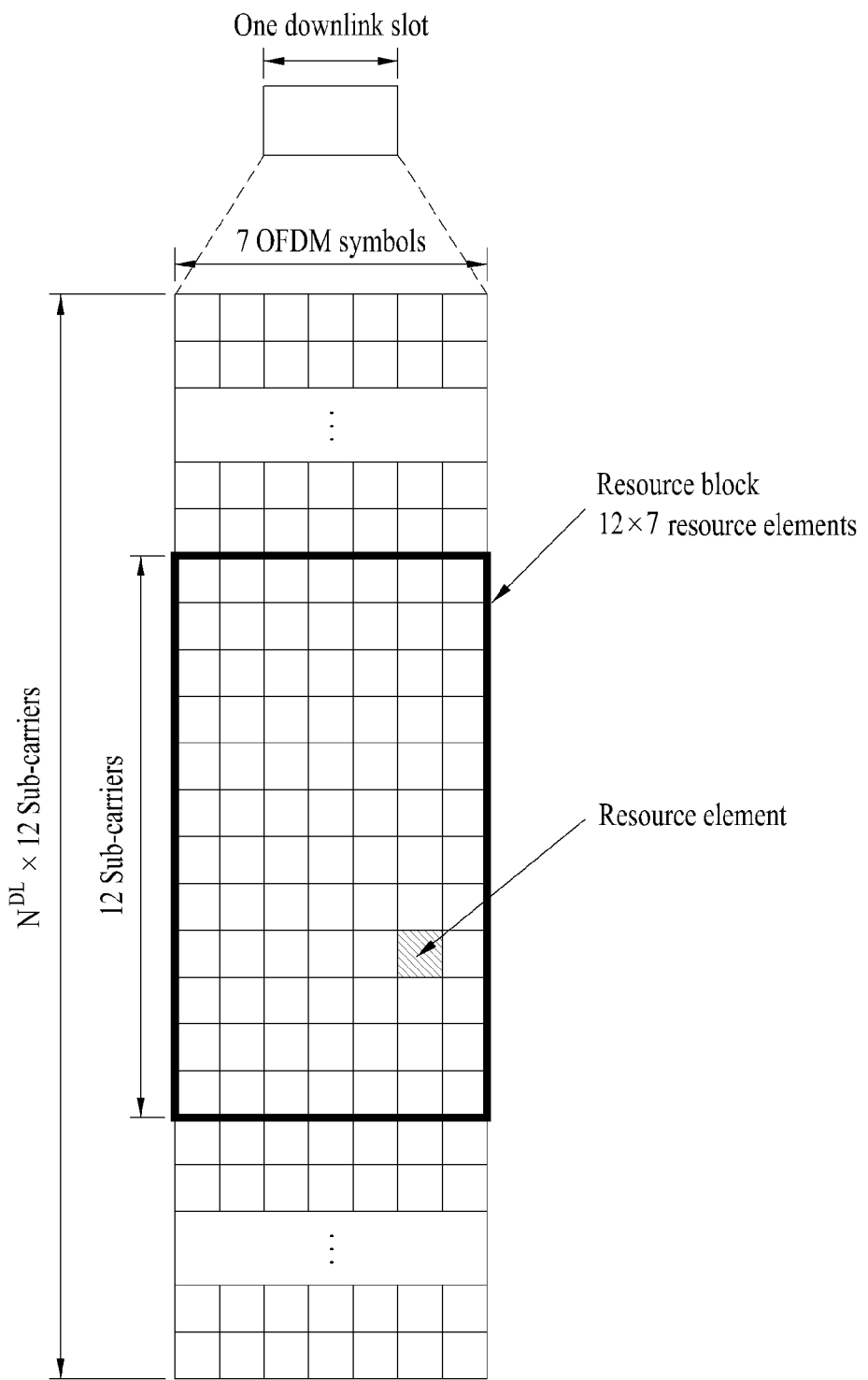
FIG. 2 exemplarily shows a resource grid of a downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
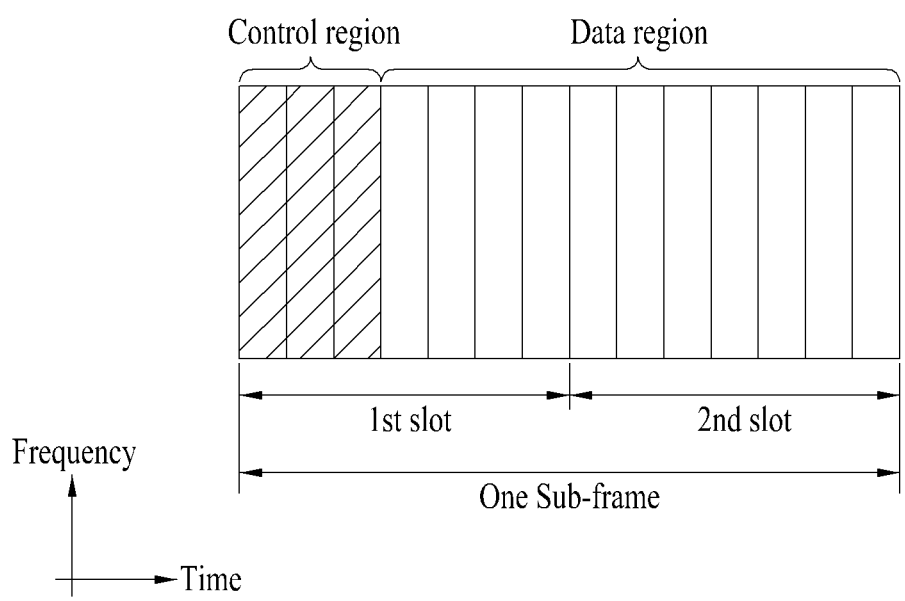
FIG. 3 exemplarily shows a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
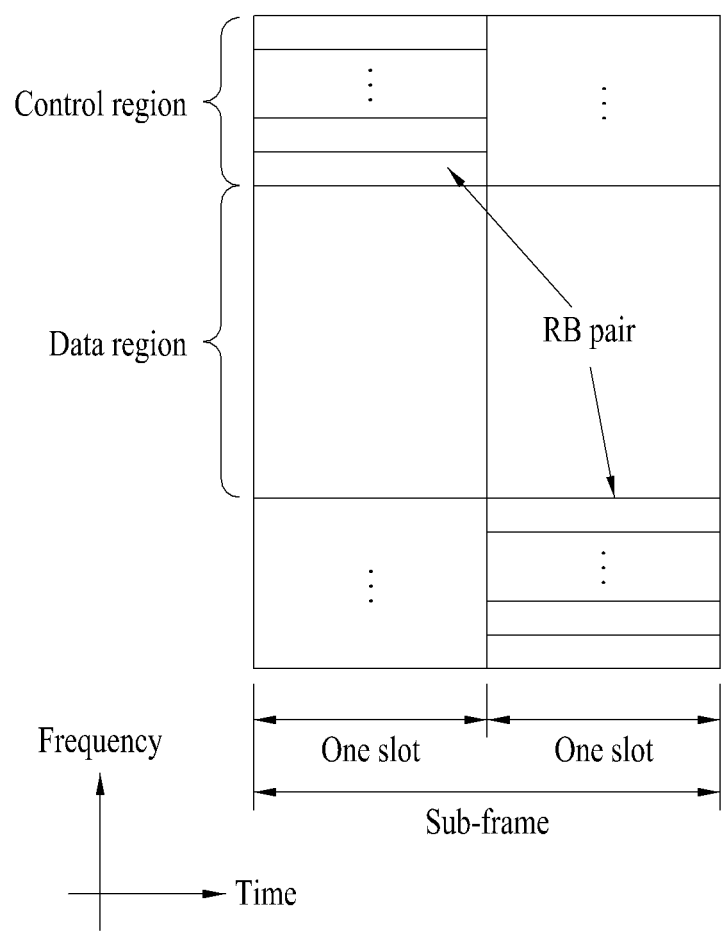
FIG. 4 exemplarily shows an uplink subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

RS may be divided into downlink RS and uplink RS. In the current LTE system, the uplink RS include:
i) DeModulation-Reference Signal (DM-RS) used for channel estimation for coherent demodulation of information delivered on a PUSCH and a PUCCH; and
ii) Sounding Reference Signal (SRS) used for a BS (eNB) or a network to measure the quality of an uplink channel in a different frequency.

The downlink RS are categorized into:
i) Cell-specific Reference Signal (CRS) shared among all UEs of a cell;
ii) UE-specific RS dedicated to a specific UE;
iii) DM-RS used for coherent demodulation of a PDSCH, when the PDSCH is transmitted;
iv) Channel State Information-Reference Signal (CSI-RS) carrying CSI, when downlink DM-RS are transmitted;
v) Multimedia Broadcast Single Frequency Network (MBSFN) RS used for coherent demodulation of a signal transmitted in MBSFN mode; and
vi) positioning RS used to estimate geographical position information about a UE.

RS may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that a BS (eNB) transmits along with downlink data in specific resources. A UE can demodulate the data by measuring a channel using the RS. This RS should be transmitted in a data transmission area.

CRS serve two purposes, that is, channel information acquisition and data demodulation. A UE-specific RS is used only for data demodulation. CRS are transmitted in every subframe in a broad band and CRS for up to four antenna ports are transmitted according to the number of Tx antennas in an eNB.

For example, if the BS (eNB) has two Tx antennas, CRS for antenna ports 0 and 1 are transmitted. In the case of four Tx antennas, CRS for antenna ports 0 to 3 are respectively transmitted.

FIG. 5 illustrates patterns in which CRS and DRS are mapped to a downlink RB pair, as defined in a legacy 3GPP LTE system (e.g. Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RS in an RB pair for a system where a BS (eNB) supports four Tx antennas are illustrated. Reference numerals 0, 1, 2 and 3 denote the REs of CRS for first to fourth antenna ports, antenna port 0 to antenna port 3, respectively, and reference character 'ID' denotes the positions of DRS.

CSI (Channel Status Information) Feedback

MIMO schemes are classified into an open-loop MIMO scheme and a closed-loop MIMO scheme. The open-loop MIMO scheme means that a transmitter performs MIMO transmission without receiving CSI feedback information from a MIMO receiver. The closed-loop MIMO scheme means that a transmitter receives CSI feedback information from the MIMO receiver and performs MIMO transmission. In accordance with the closed-loop MIMO scheme, each of a transmitter and a receiver can perform beamforming on the basis of CSI so as to obtain a multiplexing gain of a MIMO transmission antenna. The transmitter (for example, BS) can allocate an uplink control channel or an uplink shared channel to a receiver (for example, a user equipment) in such a manner that the receiver can feed back the CSI.

The feedback CSI may include a rank indicator (RI), a precoding matrix index (PMI), and a channel quality indicator (CQI).

RI is information of a channel rank. The channel rank means a maximum number of layers (or streams) via which different information can be transmitted through the same time-frequency resources. Since a rank value is determined depending on long-term fading of a channel, the rank value is generally fed back for a longer period than PMI and CQI. That is, the rank value can be fed back less frequently than PMI and CQI.

PMI is information regarding a precoding matrix used for data transmission from the transmitter, and includes spatial characteristics of a channel. Precoding means that a transmit layer is mapped to a transmit antenna, and the layer-antenna mapping relationship can be determined by precoding matrices. PMI corresponds to a UE-preferred precoding matrix index of a BS on the basis of metric data such as Signal-to-Interference plus Noise Ratio (SINR). In order to reduce feedback overhead of the precoding information, a transmitter and a receiver may share a variety of precoding matrices in advance, and only indices indicating a specific precoding matrix from among the corresponding codebook can be fed back.

Acquisition of an additional multi-user diversity using Multi-User MIMO (MU-MIMO) is under consideration in a system supporting an extended antenna configuration (e.g. an LTE-A system). In MU-MIMO, an interference channel exists between UEs multiplexed in an antenna domain. Therefore, when the eNB transmits a downlink signal based on CSI feedback received from one UE, it needs to perform the downlink transmission in a manner that avoids interference with other UEs. Hence, for a reliable MU-MIMO operation, CSI should be fed back with more accuracy than for a Single-User MIMO (SU-MIMO) operation.

To enable more accurate CSI measurement and reporting, a new CSI feedback scheme may be used by improving conventional CSI including an RI, a PMI, and a CQI. For example, precoding information fed back by a receiver may be indicated by a combination of two PMIs. One of the two PMIs (a first PMI) may be referred to as W1 having a long term and/or wideband property and the other PMI (a second PMI) may be referred to as W1 having a short term and/or subband property. A final PMI may be determined by a function of W1 and W2. For example, let the final PMI be denoted by W. Then it may defined that W=W1*W2 or W=W2*W1.

CQI is information indicating channel quality or channel strength. CQI may be represented by a combination of predetermined MCSs. That is, a feedback CQI index may indicate a modulation scheme and a code rate. Generally, a reception SINR capable of being obtained when the BS constructs a spatial channel using a PMI is applied to CQI.

The current LTE/LTE-A system defines 'CSI reference resource' related to channel measurement for the above-described CSI feedback/reporting. The CSI reference resource is defined by a group of physical RBs corresponding to a frequency band for which a CQI is calculated in the frequency domain. From a time perspective, for CSI transmission/reporting in subframe n, the CSI reference resource is defined by a single downlink subframe, n-$n_{CQI\_ref}$. i) For periodic CSI reporting, n-$n_{CQI\_ref}$ is the smallest value greater than or equal to 4, which is a valid downlink subframe. ii) For aperiodic CSI reporting, n-$n_{CQI\_ref}$ is typically the reference resource in the same valid downlink subframe as a corresponding CSI request in a DCI format for uplink transmissions. iii) For aperiodic CSI reporting triggered by a Random Access Response Grant carrying a CSI request, n-$n_{CQI\_ref}$ equals 4. A downlink subframe is considered valid when it is configured as a downlink subframe for a particular UE, it is not an MBSFN subframe except for Mode 9, it contains a DwPTS with a predetermined size or larger, it does not fall within a configured measurement gap for that UE, and for periodic CSI reporting, it should be an element of a CSI subframe set when that UE is configured with CSI subframe sets. A higher layer may configure CSI subframe sets ($C_{CSI,0}$, $C_{CSI,1}$) for the UE. The current standard defines that the CSI reference resource is included in one of the two CSI subframe sets ($C_{CSI,0}$, $C_{CSI,1}$), not in both.

Heterogeneous Deployments

Figure 6:
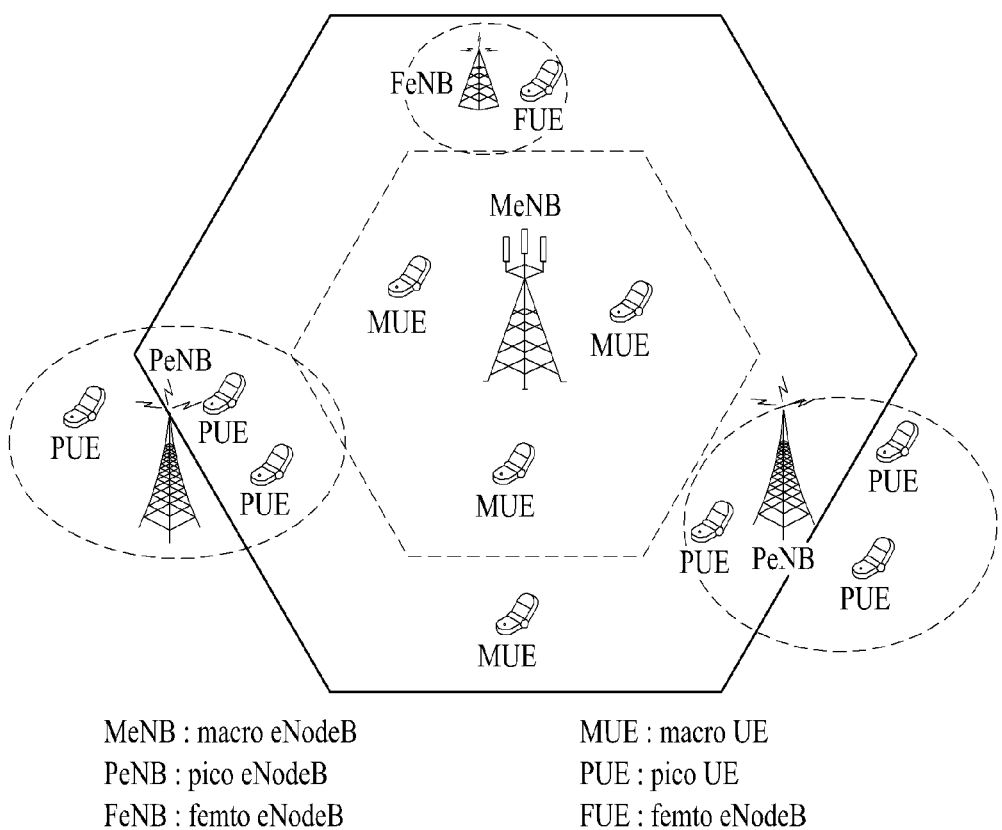
FIG. 6 is a conceptual diagram illustrating a cooperative transmission cluster.

FIG. 6 is a heterogeneous network wireless communication system including a macro eNB (MeNB) and a micro eNB (PeNB or FeNB). The term "heterogeneous network" refers to a network in which a macro eNB (MeNB) and a micro eNB (PeNB or FeNB) coexist even though the same Radio Access Technology (RAT) is used.

The macro eNB (MeNB) is a normal eNB having wide coverage and high transmission power in a wireless communication system. The macro eNB (MeNB) may also be referred to as a macro cell.

The micro eNB (PeNB or FeNB) may also be referred to as a micro cell, a pico cell, a femto cell, a home eNB (HeNB), a relay, etc. (MeNB, PeNB and FeNB may also be generically named a transmission point as necessary). The micro eNB (PeNB or FeNB) is a small-sized version of the macro eNB (MeNB), such that the micro eNB (PeNB or FeNB) may independently perform most of the functions of the macro eNB (MeNB). The micro eNB (PeNB or FeNB) may be installed (in an overlay manner) in an area covered by the macro eNB (MeNB) or may be installed (in a non-overlay manner) in a shadow area that cannot be covered by the macro eNB (MeNB). The micro eNB (PeNB or FeNB) has a narrower coverage and lower transmission power and may accommodate a smaller number of user equipments (UEs), compared to the micro eNB (MeNB).

UE, which is hereinafter referred to as a macro UE (MUE), may be directly served by the macro eNB (MeNB). UE, which is hereinafter referred to as a micro UE (MUE), may be served by the micro eNB (PeNB or FeNB). In some cases, the UE present within the coverage of the micro eNB (MeNB) may be served by the macro eNB (MeNB).

The micro eNB (eNB) may be classified into two types according to access limitations of the UE.

The first type is a Closed Subscriber Group (CSG) or non-Closed Access Subscriber Group (non-CSG) eNB serving as a cell that allows either a legacy macro UE or another micro eNB to access a micro UE. The legacy macro UE (MUE) or the like may be handed over to an OSG-type eNB.

The second type is a CSG eNB that prevents the legacy macro UE or another micro eNB from accessing the micro UE, such that it is impossible to be handed over to the CSG eNB.

Coordinated Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In this CoMP system, multi-cell BSs (eNBs) can support data for a UE. In addition, the BSs (eNBs) support one or more UEs simultaneously in the same radio frequency resources, thereby increasing system performance. The BSs (eNBs) may also operate in Space Division Multiple Access (SDMA) based on CSI between a UE and the eNBs.

A serving BS (eNB) and one or more cooperative BSs (eNBs) are connected to a scheduler through a backbone network in the CoMP system. The scheduler may receive channel information about the channel states between a UE and the cooperative eNBs, measured by each cooperative BS (eNB) and operate based on the channel information. For example, the scheduler may schedule information for cooperative MIMO for the serving BS (eNB) and the one or more cooperative BSs (eNBs). That is, the scheduler may transmit a command directly to each eNB in regard to the cooperative MIMO operation.

As can be seen from the above description, it can be recognized that a CoMP system operates as a virtual MIMO system by grouping a plurality of cells into one group. Basically, the CoMP system adopts a MIMO communication scheme using multiple antennas.

Figure 7:
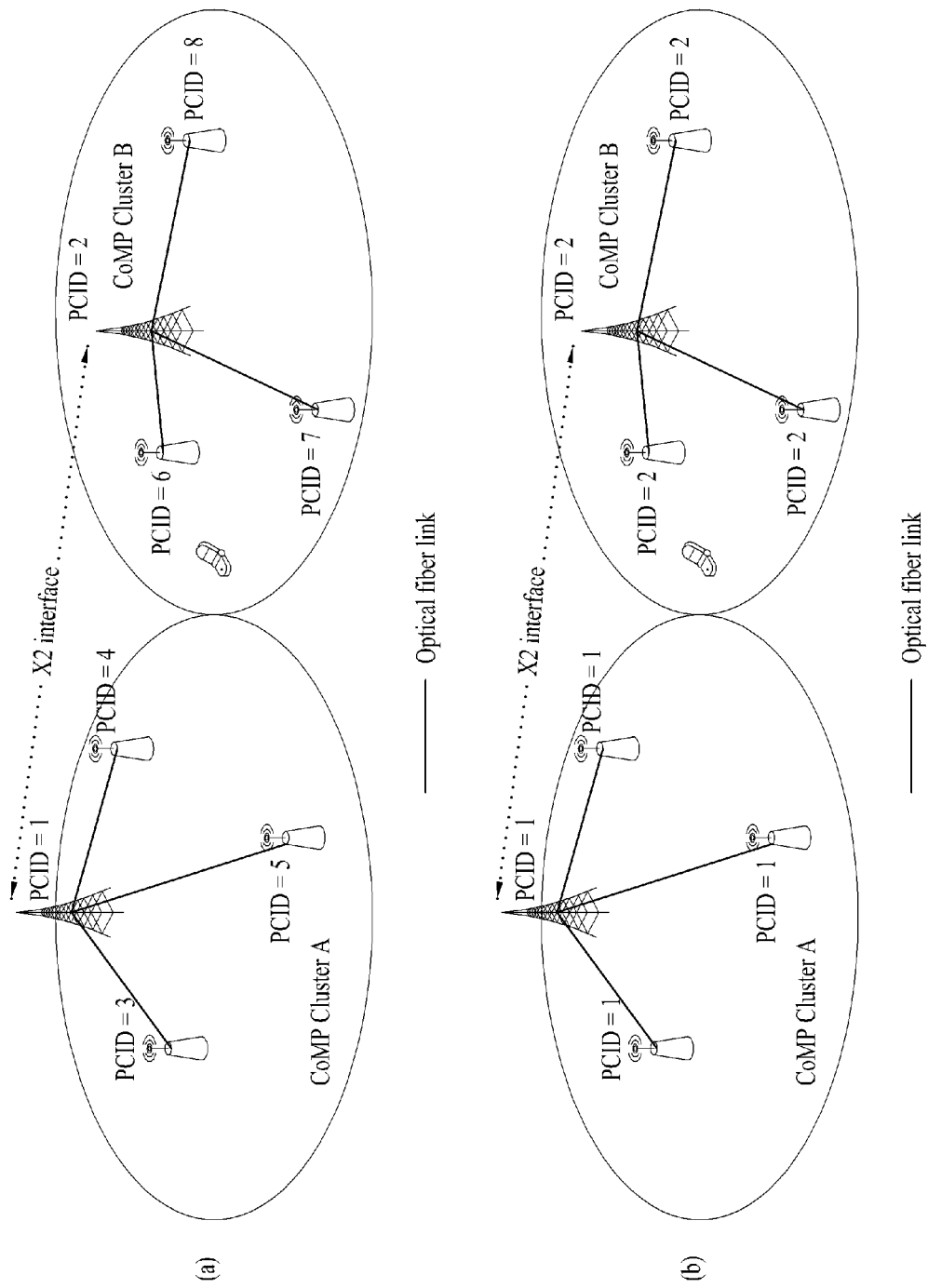
FIG. 7 is a conceptual diagram illustrating CoMP (Coordinated Multi Point) cluster.

A CoMP cluster is a set of cells that are capable of performing the CoMP operations (i.e., cooperative scheduling and cooperative data transmission/reception). For example, cells of a single cluster may be assigned different physical cell IDs (PCIDs) as shown in FIG. 7(a), and cells of a single cluster may share the same PCIDs such that the cells may be configured in the form of a distributed antenna or RRH of a single BS. In modified examples of FIG. 7, some cells from among cells of the single cluster may share the same PCIDs.

Generally, cells of the same CoMP cluster are interconnected through a backhaul link, such as an optical fiber having high capacity and low latency, so as to implement cooperative scheduling and cooperative data transmission/reception, such that the cooperative scheduling is possible and maintained at a correct time synchronization state, resulting in implementation of cooperative data transmission. In addition, when receiving signals from cells of the CoMP cluster participating in the cooperative transmission, the size of CoMP cluster must be determined in a manner that a reception time difference between signals transmitted from respective cells can enter the scope of a cyclic prefix (CP) length on the basis of a propagation delay difference between respective cells. In contrast, cells belonging to different clusters may be interconnected through a lower-capacity backhaul link, and may not maintain time synchronization.

A UE configured to perform CoMP can perform cooperative scheduling and cooperative data transmission/reception by some or all of cells contained in the CoMP cluster, and the UE measures a reference signal that is transmitted from some or all cells of the CoMP cluster according to a UE reception signal quality (i.e., QoS of a UE reception signal). In order to measure link performances of UE and each cell, the UE may measure a reference signal of each cell and may report a QoS of the measured reference signal. Specifically, cells to be measured by the UE may be defined as a CoMP measurement set.

For CoMP, there is a need to define the reference resource set through which UE channel measurement and UE channel measurement reporting must be performed, because the CoMP scheme and downlink scheduling, etc. of the corresponding UE are determined according to per-cell channel information to be reported by the UE on uplink. Information (i.e., the CoMP measurement set) indicating that the UE must measure/report signals from a certain cell should be transferred through higher layer signaling, and associated information can be signaled as CSI-RS resources.

Inter-Cell Interference Coordination (ICIC)

In the above-mentioned heterogeneous network environment (heterogeneous deployment) or CoMP environment, inter-cell interference (ICI) may occur. In order to solve the inter-cell interference (ICI) problem, an inter-cell interference coordination (ICIC) may be used.

As an exemplary ICIC of the frequency resource, the 3GPP LTE Release-8 system is designed to divide an overall frequency region (for example, a system bandwidth) into one or more sub-regions (for example, a physical resource block (PRB) unit), and a predetermined scheme for exchanging ICIC messages of individual frequency sub-regions between cells is defined in the 3GPP LTE Release-8 system. A variety of parameters may be contained in an ICIC message for frequency resources. For example, a Relative Narrowband Transmission Power (RNTP) related to downlink transmission power, uplink (UL) Interference Overhead Indication (MI) related to uplink interference, UL High Interference Indication (HII), etc. may be defined in the ICIC message for frequency resources.

RNTP is information indicating downlink transmission power used in a specific frequency sub-region by a cell transmitting an ICIC message. For example, if an RNTP field for a specific frequency sub-region is set to a first value (for example, 0), this means that downlink transmission power of the corresponding cell does not exceed a predetermined threshold value in the corresponding frequency sub-region. Alternatively, if the RNTP field for the specific frequency sub-region is set to a second value (for example, 1), this means that the corresponding cell cannot promise downlink transmission power in the corresponding frequency sub-region. In other words, if the RNTP field is set to zero '0', this means that downlink transmission power of the corresponding cell is low in the corresponding frequency sub-region. Otherwise, if the RNTP field is set to 1, this means that downlink transmission power of the corresponding cell is not low in the corresponding frequency sub-region.

UL IOI is information indicating the amount of uplink interference experienced (or generated) in a specific frequency sub-region including a cell configured to transmit an ICIC message. For example, if an IOI field for a specific frequency sub-region has a high-interference amount, this means that the corresponding cell experiences high uplink interference in the corresponding frequency sub-region. In the frequency sub-region corresponding to an IOI indicating high uplink interference, the cell having received the ICIC message can schedule a UE that uses low uplink transmission power from among serving UEs of the cell. Therefore, since UEs perform uplink transmission at low transmission power in the frequency sub-region corresponding to an IOI indicating high uplink interference, uplink interference experienced by a neighbor cell (that is, a cell having transmitted the ICIC message) may be reduced.

UL HII indicates the degree of interference (or uplink interference sensitivity) that may be encountered in the corresponding frequency sub-region because of uplink transmission within a cell configured to transmit the ICIC message. For example, if the HII field is set to a first value (for example, 1) in a specific frequency sub-region, there is a high possibility of scheduling a high uplink transmission power UE by a cell for transmission of the ICIC message in the corresponding frequency sub-region. On the other hand, if the HII field is set to a second value (for example, 0) in a specific frequency sub-region, there is a possibility of scheduling a low uplink transmission power UE by the cell for transmission of the ICI message in the corresponding frequency sub-region. Meanwhile, if a UE is first scheduled in a frequency sub-region in which an HII is set to a second value (for example, 0) and some UEs capable of properly operating even under high interference are scheduled in another frequency sub-region in which an HII is set to a first value (for example, 1), one cell having received the ICIC message can avoid interference from another cell having transmitted the ICIC message.

Meanwhile, as an exemplary ICIC of the time resource, the 3GPP LTE-A system (or 3GPP LTE Release-10) system is designed to divide an overall time region into one or more sub-regions (for example, a subframe unit) in a frequency domain, and a predetermined scheme for exchanging specific information indicating silencing or non-silencing of individual frequency sub-regions between cells is defined in the 3GPP LTE-A system. The cell having transmitted the ICIC message may transmit specific information indicating the presence of silencing in a specific subframe to neighbor cells, and does not schedule a PDSCH and a PUSCH in the corresponding subframe. On the other hand, the cell having received the ICIC message can schedule uplink transmission and/or downlink transmission for a UE on a subframe in which silencing is performed in another cell having transmitted the ICIC message.

Silencing may refer to an operation of a specific cell within a specific subframe. That is, the silencing operation indicates that a specific cell does not perform most of signal transmission on uplink or downlink of a specific subframe. If necessary, the silencing operation may also indicate that a specific cell can transmit signals at no power or low power on uplink and downlink of a specific subframe. As an example of the silencing operation, a specific cell may configure a specific subframe as a Multicast-Broadcast Single Frequency Network (MBSFN) subframe. In a downlink subframe configured as the MBSFN subframe, a signal is transmitted only in a control region and is not transmitted in a data region. As another example of the silencing operation, a cell causing interference may configure a specific frame as a specific Almost Blank Subframe (ABS) or an ABS-with-MBSFN.

The ABS refers to a subframe in which only a CRS is transmitted in a control region and a data region of a downlink subframe and the remaining control information and data other than the CRS are not transmitted in the control and data regions of the downlink subframe. If necessary, signals are transmitted at no power or low power in the subframe corresponding to the ABS. Nonetheless, downlink channels and downlink signals such as a Physical Broadcast Channel (PBCH), a Primary Synchronization Signal (PSS), and a Secondary Synchronization Signal (SSS) may be transmitted even in the ABS. The ABS-with-MBSFN may mean a subframe in which even the CRS is not transmitted in the data region of the above-described ABS. As described above, silencing may be performed in units of a specific subframe, and information indicating whether silencing is performed is referred to as a silent subframe pattern.

In association with ABS, ABS signaling defined in 3GPP LTE-A is largely classified into ABS information and an ABS status. The ABS information indicates a subframe to be used as ABS using bitmap. The ABS information is composed of 40 bits in case of FDD, and is composed of a maximum of 70 bits in case of TDD. The number of bits used for ABS information in TDD may be changed according to UL-DL configuration. In case of FDD, 40 bits indicate 40 subframes. If the value of a bit is set to 1, the bit indicates ABS. If the value of a bit is set to zero, the bit indicates non-ABS. When restricted measurement is configured in a UE, the number of CRS antenna ports of the corresponding cell is notified for CRS measurement. A measurement subset is a subset of ABS pattern information. The measurement subset is a bitmap composed of 40 bits in case of FDD, and is a bitmap composed of a maximum of 70 bits in case of TDD. The above information can be understood as a restricted measurement for configuring restricted measurement. Table 1 indicates ABS information defined in the legacy LTE/LTE-A system.

TABLE 1

| IE/Group Name | Presence | Range | IE type and reference | Semantics description |
| --- | --- | --- | --- | --- |
| CHOICE ABS Information | M | — | — | |
| >FDD | | | | |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 . . . 70, . . . ) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211 [10]. |

TABLE 1-continued

| IE/Group Name | Presence | Range | IE type and reference | Semantics description |
|---|---|---|---|---|
| | | | | The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |

Table 2 shows ABS status information elements (IEs) defined in the legacy LTE/LTE-A system. The ABS status information elements are used to enable the eNB to determine whether the ABS pattern must be changed. In Table 2, 'Usable ABS Pattern Info' is bitmap information of a subset of ABS pattern information, and indicates whether a subframe designated as ABS has been correctly used for interference reduction. 'DL ABS status' indicates the ratio of the number of DL RBs scheduled in a subframe indicated by 'Usable ABS Pattern Info' to the number of RBs allocated for a UE to be protected through ABS. 'DL ABS status' may also indicate whether ABS has been efficiently used in a victim cell according to its own purpose.

TABLE 2

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the $eNB_2$ for UEs needing protection by ABS from inter-cell interference for DL scheduling, or allocated by the $eNB_2$ for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position in the bitmap represents a subframe, for which value "1" indicates 'ABS that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding ABS Pattern Info IE conveyed in the LOAD INFORMATION message from the $eNB_1$. |
| >TDD | | | — | — |
| >>Usable ABS Pattern Info | M | | BIT STRING (1 . . . 70) | Each position in the bitmap represents a subframe, for which value "1" indicates 'ABS that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding ABS Pattern Info IE conveyed in the LOAD INFORMATION message from the $eNB_1$. |

A measurement subset composed of a subset of an ABS pattern is a subframe statically used as ABS, and the remaining subframes contained in the ABS pattern may determine whether a transmission point will be used as the ABS according to traffic load.

Measurement/Measurement Report

A measurement report is used for many techniques designed to ensure the mobility of UEs (handover, random access, cell search, etc.) or for one of the techniques. Since the measurement report needs a certain degree of coherent demodulation, a UE may perform measurement after acquiring synchronization and physical layer parameters, except for measurement of a received signal strength. The measurement report conceptually covers Radio Resource Management (RRM) measurement of measuring the signal strengths or signal strengths to total reception power of a serving cell and neighbor cells, including Reference Signal Received Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has been failed.

In association with Radio Resource Management (RRM), RSRP is defined as the linear average over the power contributions of REs that carry downlink CRS. RSSI is defined as the linear average of the total received power of a UE. The RSSI is measured from OFDM symbols carrying RS for antenna port 0, including interference and noise power from neighbor cells. If a specific subframe is indicated for RSRQ measurement by higher-layer signaling, the RSSI is measured over all OFDM symbols of the indicated subframe. RSRQ is defined as (N×RSRP/RSSI), where N is the number of RBs over the measurement bandwidth of RSSI.

The purpose of RLM execution is to enable a UE to monitor a downlink quality of its own serving cell, such that the UE can determine 'in-sync' or 'out-of-sync' of the corresponding cell. In this case, RLM is based on CRS. A downlink quality estimated by the UE is compared with each of 'in-sync threshold (Qin)' and 'out-of-sync threshold (Qout)'. Each threshold value may be denoted by a PDCCH BLER (Block Error Rate) of a serving cell. Specifically, Qout may correspond to a BLER of 10%, and Qin may correspond to a BLER of 2%. Actually, Qin and Qout correspond to SINR of the received CRS. If CRS reception SINR is equal to or higher than a predetermined level (Qin), the UE decides to attach the corresponding cell. If CRS reception SINR is less than a predetermined level (Qout), the UE declares a radio link failure (RLF).

As can be seen from the above-mentioned RSRP definition, it should be premised that measurement reporting is performed using CRS. However, assuming that cells share the same PCID as shown in FIG. 7(b), the cells are unable to discriminate between the cells having the same PCID on the basis of the CRS, such that it is impossible to perform RRM of each cell using only measurement reporting including RSRP/RSRQ based on CRS. Therefore, assuming that cells have the same PCID, it is possible to perform additional RSRP/RSRQ measurement reporting on the basis of CSI-RS being independently transmitted. In order to increase reception accuracy during CSI-RS reception of a specific cell, neighbor cells do not transmit signals to a resource element (RE) to which the corresponding CSI-RS is transmitted, such that the neighbor cells can perform higher-accuracy measurement although a frequency of CRS-RS transmission is less than a frequency of CRS transmission. Therefore, although cells have different PCIDs, CRS-based RSRP/RSRQ measurement reporting and CSI-RS RSRP/RSRQ measurement reporting are simultaneously performed, resulting in increased accuracy of a network RRM.

Another purpose of CSR-RS transmission in each cell is to perform CSI feedback to be performed by a UE to aid scheduling of a BS (eNB) that determines a rank, precoding matrix, a modulation and coding scheme (MCS) or CQI to be used for DL data transmission between the corresponding cell and the UE. In accordance with the CoMP transmission scheme, the UE must feed back a CSI to a downlink related to a cooperative cell other than the serving cell. An excessive amount of overhead occurs when CSIs of all cells contained in the CoMP cluster including the serving cell are fed back, such that CSIs of some cells (i.e., CoMP measurement set) contained in the CoMP cluster that is valuable in cooperative scheduling and cooperative data transmission. Deciding of the CoMP measurement set of a specific UE may be configured by selecting cells each having an RSRP of a predetermined level or higher. To achieve the above-mentioned operation, the UE performs RSRP measurement reporting of cells contained in the CoMP cluster including the UE. Alternatively, the BS sets configurations of CSI_RS each of which will perform RSPR or RSRQ measurement to a CoMP measurement set, and informs the UE of the resultant configurations. The UE may perform RSRP or RSRQ measurement of CSI-RS transmitted from cells contained in the CoMP management set. If the measurement result satisfies a specific condition, the UE may perform reporting.

In order to implement ICIC between CoMP clusters, a UE performs RSRP measurement and reporting of cells contained in a contiguous CoMP cluster, such that a network and a UE can recognize which one of cells of the contiguous CoMP cluster gives strong interference to the corresponding UE and can also recognize which one of cells receives strong UL interference from the corresponding UE.

In addition to CRS based RSRP/RSRQ measurement reporting for mobility management of UE handover, the CoMP measurement set configuration and the CSI-RS based RSRP/RSRQ measurement reporting for ICIC are simultaneously performed, such that accuracy and flexibility of network RRM can be increased.

Restricted Measurement

If a cell reduces a transmission (Tx) power of a specific resource region, a variation width of a per-resource-region interference signal received by a contiguous cell is increased. If averaging of the interference signals is achieved irrespective of a resource region, it is difficult to correctly obtain CoMP and ICIC effects. A detailed description thereof will hereinafter be described with reference to FIG. 8.

Figure 8:
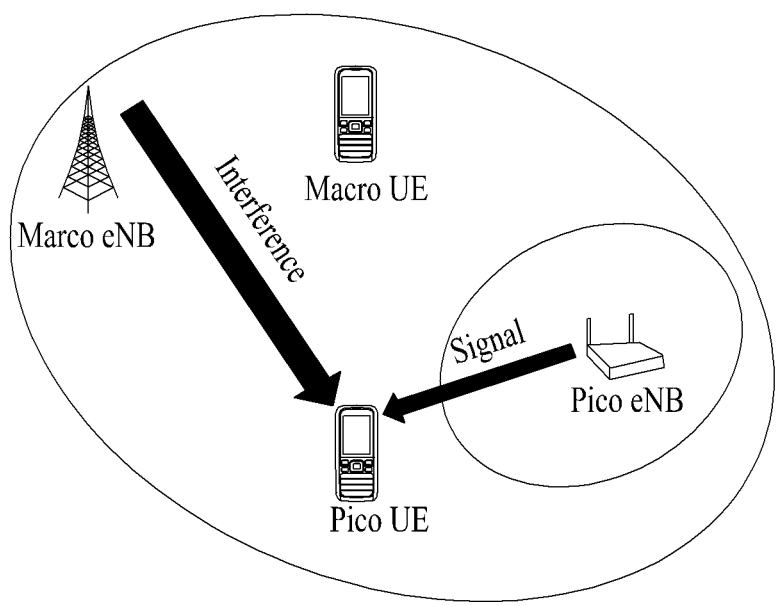
FIG. 8 is a conceptual diagram illustrating restricted measurement.

Referring to FIG. 8, in case of a normal situation, a macro cell (macro eNB) is used as an aggressor cell of a pico cell (pico eNB). The macro cell (macro eNB) can guarantee/protect performance of the pico cell (pico eNB) using the aforementioned ABS for the pico cell or pico UE. In more detail, the macro cell can deboost a maximum of 9 bB transmission power in specific subframe(s), or may not transmit signals in the specific subframe(s), resulting in the cell range extension (CRE) effect of the pico cell. In other words, if a macro cell reduces a downlink transmission power in the ABS, a UE located in the vicinity of a cell edge of cells can recognize that performance of a picocell signal having been received with a noise level or lower in a normal subframe is increased in a manner that data can be stably received in the ABS, such that cell coverage of a pico cell can be actually extended.

Under this situation, restricted measurement may be used for measurement reporting. In other words, if the macro cell reduces a transmission power in a specific subframe through the ABS, signals and/or interference level of the pico cell seen by the UE is greatly changed per subframe, and it is prevented that signals are simply averaged due to introduction of the restricted measurement.

For such restricted measurement, if several CSI subframe sets (e.g., C0, C0 for channel measurement are used as a higher layer signal, the UE can perform channel measurement and reporting dedicated for the CSI subframe set. In addition, it is desirable that the UE may perform ABS measurement of the macro cell for RLM/RRM.

Cell Range Extension (CRE)

Several small-sized pico eNBs (BSs) are installed in a coverage of the macro BS, such that UEs covered by the macro BS are handed over to the pico BS, resulting in traffic dispersion of the macro BS. Handover from a serving BS to a target BS is achieved when target-BS measurement result obtained from the UE is identical to or higher than a predetermined threshold value (Sth_conv). In this case, the network improves UE capability using arbitrary means, such that handover can be performed even though signal strength (e.g., SNR) of the target BS is less than a predetermined threshold. The above-mentioned operation may be referred to as a cell range expansion (CRE). A CRE enable region is referred to as a CRE region/area, and the CRE region may be represented by a specific region in which a reception performance ($S_{received}$) of a reference signal of the corresponding BS is higher than a new threshold value ($S_{th\_CRE}$) for CRE. That is, the CRE region configures the following Expression 1.

$$S_{th\_conv} \geq S_{received} \geq S_{th\_CRE}$$ [Expression 1]

For better understanding of the present invention, a CRE region configured to satisfy Equation 1 may correspond to a shaded part.

Figure 9:
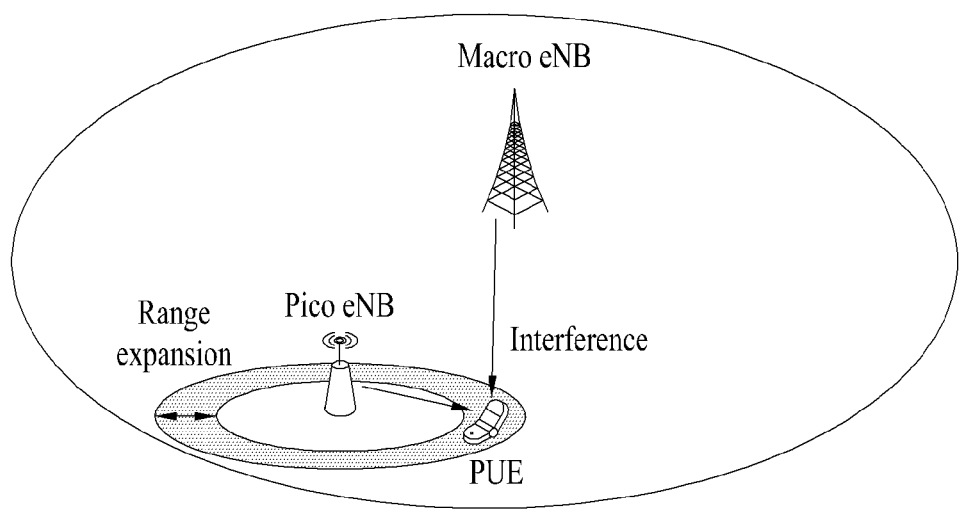
FIG. 9 is a conceptual diagram illustrating Cell Ranging Expansion (CRE).

In FIG. 9, a macro eNB enables a PUE located in the CRE region to be handed over to a pico eNB (PeNB), resulting in implementation of traffic offloading. As a result, overall system performance is improved. The CRE can extend a cell range or a cell radius of the corresponding eNB. In the legacy LTE/LTE-A system, a reference signal reception intensity of the PeNB may be denoted by RSRP/RSRQ, a reference for enabling the UE to attach a specific cell satisfies a specific condition in which a difference between the best RSRP and a specific cell RSRP is 6 dB or less on the basis of per-cell RSRP. However, in order to increase the traffic dispersion effect to the PeNB, the reference may be adjusted to 6 dB (e.g., 9 dB) or higher. In this case, the operation (i.e., CRE) for enabling the UE to measure the PeNB, when the UE performs handover to the PeNB and then measures the PeNB acting as a serving cell, influence of interference caused by the macro eNB (that is located close to the PeNB and includes other BSs not shown in drawings may be further increased unavoidably. Therefore, the following description discloses a variety of methods for solving various interference problems encountered when a reference is higher than the CRE reference.

Therefore, the following description discloses a variety of methods for solving various interference problems encountered when a reference is higher than the CRE reference.

In the following description, the UE may have Further enhanced ICIC (FeICIC) capability capable of supporting FeICIC. In this case, FeICIC means that a pico eNB performs CRE of at least 6 dB and at the same time the macro eNb and the pico eNB perform time/frequency ICIC. There are a variety of UE capabilities related to FeICIC capability, for example, CRS interference cancellation (CRS IC) capability (including the number of CRSs to cancel, the number of CRSs capable of being cancelled in one subframe, and information indicating how many cells can be CRS-cancelled) capable of performing cancellation of CRS interference, PSS/SSS IC capability (including the number of PSSs/SSSs to cancel, the number of PSSs/SSSs capable of being cancelled in one subframe, and information indicating how many cells can be PSS/SSS-cancelled) capable of cancelling PSS/SSS interference of a contiguous cell, PBCH IC capability (including the number of PBCHs to cancel, the number of PBCHs capable of being cancelled in one subframe, and information indicating how many cells can be PBCH-cancelled) capable of cancelling PBCH interference of a contiguous cell. Hereinafter, the UE capability related to FeICIC capability will be referred to as CRE-related capability. UE capability information related to CRE may be transferred from a UE to a core network after RRC connection. In more detail, after the UE performs RRC connection, the core network transmits UEcapabilityEnquiry information to the UE through NAS (Non-Access Stratum) signaling, and the UE transmits UE capability information in response to the received UECapabilityEnquiry information. If necessary, the core network may transmit the UECapabilityEnquiry information.

In the following description, the term 'measurement' refers to measurement of at least one of RRM/RLM/CSI unless specially noted, and each of the neighbor cell receiving interference and the serving cell receiving interference may be referred to as a weak cell or a victim cell, and a cell causing interference may be referred to as an aggressor cell.

CRS Handling Method of UE in Interference Situation and Neighbor Cell CRS Information Although a UE of a pico eNB may receive data/control channels in an environment in which interference with a macro eNB is mitigated, through ABS of the macro eNB, interference due to CRS of the macro eNB is not reduced. Thus, in this case, the UE may increase a reception performance thereof using a CRS interference cancellation/suppression scheme of the macro eNB.

In order to enable the UE to cancel/suppress CRS of the macro eNB, the UE has to recognize CRS information of a neighbor cell. That is, for CRS handling operations (i.e., interference cancellation, rate matching at transmitter, suppression or puncturing, etc.) of the neighbor cell, the UE needs to receive a cell ID of each cell (that must perform the above operations), information regarding the number of CRS ports, subframe information (for example, MBSFN configuration) for CRS transmission, bandwidth information required for CRS transmission of the corresponding cell, etc. Therefore, the macro eNB can transmit such CRS information to the UE, and the UE having received the CRS information can perform CRS handling only at a subframe to which CRS causing interference is transmitted, and can also perform the CRS handling at a bandwidth and an RE.

A message 'NeighborCellCRSInformation' requisite for transmission of such information may be defined as the following table 4.

TABLE 4

NeighborCellCRSInformation ::=    CHOICE {
  Cell ID
    { number of CRS ports,
      frequency information of CRS transmission,
      time information of CRS transmission }
  }

Multiple cell IDs may be transmitted in 'NeighborCellCRSInformation', the number of CRS ports per cell ID, transmission of frequency CRS information, and time information of CRS transmission may be transmitted. Whereas the number of CRS ports per specific cell ID must be transmitted, frequency CRS information transmission and CRS transmission time information may be transmitted as necessary. In this case, the frequency CRS information transmission may be frequency information related to CRS transmission, and may be denoted by a center frequency and bandwidth of a specific cell, or the number of PRBs for CRS transmission and the PRB position information. The term 'time information' for CRS transmission may be time information related to CRS transmission, and may be denoted by a subframe in which CRS is transmitted. For example, the time information may be set to MBSFN subframe configuration.

MBSFN may not be configured at all according to a cell. In this case, it may be impossible to indicate the MBSFN subframe configuration of the corresponding cell. Alternatively, the eNBs do not exchange information through the X2 interface in real time, and MBSFN is configured by a specific cell and the configured MBSFN information is not updated to another cell, such that it is impossible to recognize the MBSFN subframe configuration of a specific cell of the serving cell and therefore the MBSFN is not delivered to a desired destination.

Therefore, assuming that the UE receives only information indicating the number of CRS ports of a specific cell and does not receive the MBSFN subframe configuration, it is assumed that the corresponding cell of all subframes is used as MBSFN and all subframes are used as normal subframes. According to the above-mentioned assumption, the UE can perform cancellation/reduction/puncturing/suppression/rate-matching of CRS of the corresponding cell only in the case of a normal subframe. However, if it is assumed that the neighbor cell is a normal subframe although the neighbor cell is actually used as the MBSFN subframe, and if the UE performs CRS interference cancellation on the assumption that CRS is present although CRS of the corresponding cell is not actually present, channel estimation errors unavoidably increase. Therefore, assuming that the UE does not recognize the MBSFN subframe configuration of the neighbor cell, the UE may assume the MBSFN subframe configuration rather than the normal subframe configuration.

In another embodiment, if the UE receives only information regarding the number of CRS ports of a neighbor cell and does not receive the MBSFN subframe configuration, the UE assumes that all subframes of the corresponding cell are used as normal subframes, and can perform only CRS puncturing without cancelling CRS interference.

In another embodiment, if the eNB does not recognize the MBSFN subframe configuration of the neighbor cell, the MBSFN subframe configuration of the neighbor cell may not be sent as described above. However, the eNB may enable the UE to perform the operations allocated to the UE by transmitting arbitrary configuration information. For example, when the eNB transmits information corresponding to the MBSFN subframe configuration of a specific cell that does not recognize the MBSFN subframe configuration, the eNB may indicate that all subframes of the corresponding cell are normal subframes (or MBSFN subframes).

In another embodiment, the eNB transmit information confirming whether subframe is configured as MBSFN subframe or not. That is, the information includes information guaranteeing MBSFN configuration of the neighbor cell and/or information about subframe which is not identified whether MBSFN subframe or not. The UE receives above information performs CRS handling, cancellation/reduction/puncturing/suppression/rate-matching of CRS at MBSFN subframe and does not perform the CRS handling at normal subframe. On the other hand, the UE performs CRS handling except interference cancellation (i.e. puncturing) at subframe which is not guaranteed as MBSFN subframe by serving cell.

Method of Measuring Interference by UE when Restricted Measurement is Configured Hereinafter, CRS handling of a UE and information/operations required therefor when CRSs are transmitted at corresponding positions of a serving cell of the UE and neighbor macro cells, and thus, the CRSs of various cells collide with each other (hereinafter, this case will be referred to as a Colliding CRS case) will be described. In particular, a method of measuring interference of a UE when restricted measurement is configured will be described.

Figure 10:
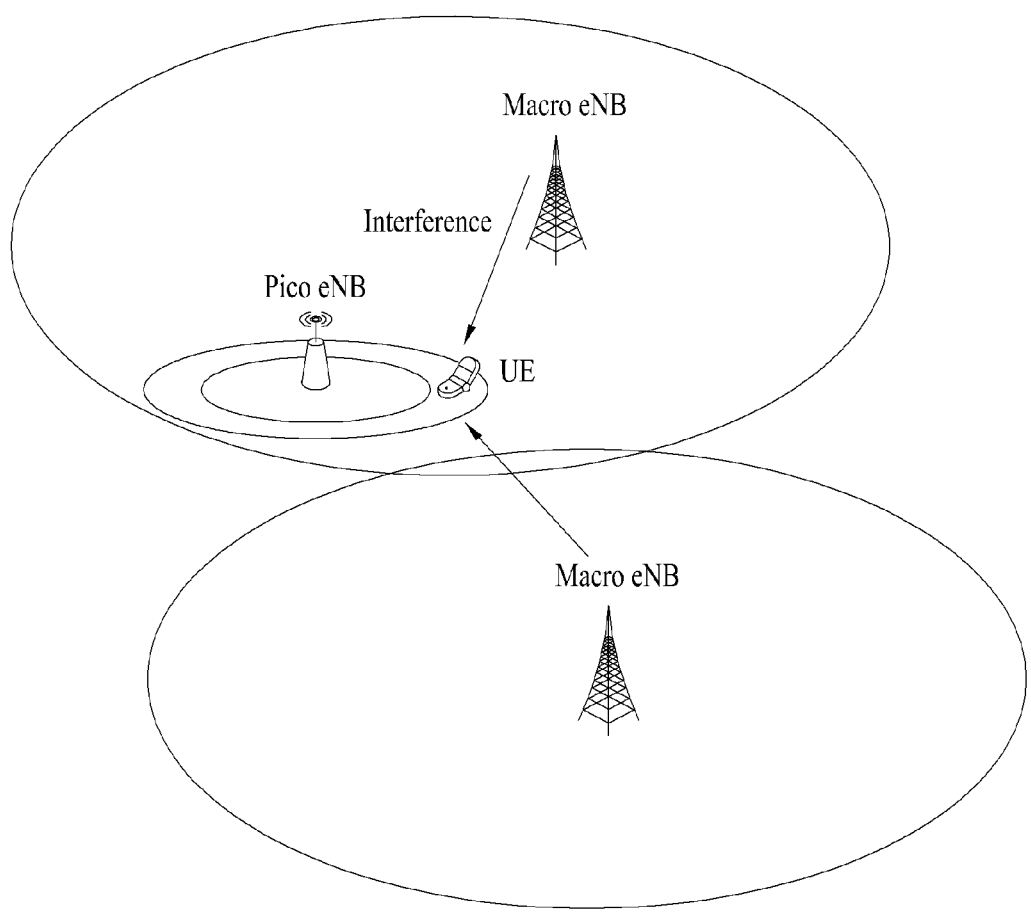
FIG. 10 is a diagram illustrating interference measurement according to an embodiment of the present invention.

The following description may be applied to a UE in an environment illustrated in FIG. 10. In detail, referring to FIG. 10, the UE may belong to a region (which may be a CRE region) of a pico eNB as a serving cell and may be interfered by neighbor macro eNBs Macro eNB 1 and Macro eNB 2. Here, the neighbor macro eNBs of the pico eNB may collaborate with each other using methods such as ABS, RNTP, HII, IOI, or the like. Unlike in FIG. 10, neighbor cells of the pico eNB may form one CoMP cluster. In addition, hereinafter, it is assumed that CRSs are transmitted at corresponding positions of a serving cell of the UE and neighbor macro cells, and thus, the CRSs of various cells collide with each other.

Interference measurement for calculation of CSI of a UE (having interference cancellation capability) may be performed by performing CRS IC based on NeighborCellCRS-Information of the aforementioned neighbor cells, and estimating a channel based on the result of the performing CRS IC, and performing demodulation of the CSI and data. Here, interference (I) which is subjected to measurement may be given according to Expression 2 below $$I = I_0 + I_{N\_CRS} \qquad \text{[Expression 2]}$$
$$= I_0 + \sum_k I_{C,k}$$

In Expression 2 above, I denotes interference measured at a CRS position of a serving cell and $I_0$ denotes remaining interference obtained by excluding CRS interference of neighbor cells from entire interference. $I_{N\_CRS}$ indicates interference with a specific eNB. In detail, in the colliding CRS case, $I_{N\_CRS}$ may denote CRS interference due to CRSs of neighbor cells, which are transmitted at positions corresponding to a CRS position of a serving cell and may be the sum of a plurality of CRS interferences when CRSs of a plurality of cells collide with the CRS of the serving cell. Here, the sum of a plurality of CRS interferences denotes CRS interferences of cells corresponding to IDs, a CRS of which collides with the serving cell, from among a cell ID list provided by CRS information of neighbor cells. The UE may recognize an eNB, a CRS of which collides with the serving cell of the UE, based on the CRS information of the neighbor cells, received from the serving cell, and measure and calculate colliding CRS interference based on the recognition result. $I_{C,k}$ denotes CRS interference of a $k_{th}$ cell, a CRS of which collides with the serving cell.

Expression 2 above may be rewritten by Expression 3 below.

$$I = I_0 + \sum_k I_{C,k} \qquad \text{[Expression 3]}$$
$$= I_0 + \sum_k \Delta_k \cdot I_{N\_CRS,k}$$

In Expression 3 above, $I_{C,k}$ denotes interference of a $k_{th}$ cell, a CRS of which collides with the serving cell and is corrected using $\Delta_k$ that can reflect actual interference therein according to a subframe or a measurement subframe subset. $I_{N\_CRS,k}$ denotes CRS interference of a $k_{th}$ neighbor cell. $\Delta_k$ is a weighting factor (correction value) for the correction of $I_{N\_CRS,k}$ and is a value for determination of a reflection degree of $I_{N\_CRS,k}$ or the like for calculation of actual interference. $\Delta_k$ may represent a specific interference environment and may be defined as a subframe-specific value, which means that it may be difficult to correctly report CSI simply by performing CRS IC based on the CRS information of the neighbor cells, received from the UE. In more detail, although the UE may perform CRS IC to eliminate interference due to CRSs of neighbor cells, interference of neighbor cells with respect to a PDSCH region is still present. Thus, for this reason, a correction value as information corresponding to a ratio of PDSCH EPRE to CRS EPRE of a neighbor cell, traffic loading, or the like may be applied.

In the aforementioned example, in particular, when restricted measurement is configured to the UE, that is, a first subframe set (measurement subset C0) related to ABS and a second subframe set (measurement subset C1) related to a normal subframe are set for the UE, weighting factors (that is, correction values) for the aforementioned correction may be set for respective subframe sets (that is, respective subsets). For example, $\Delta_k=\Delta_{k,C0}$ may be set in the measurement subset C0 and $\Delta_k=\Delta_{k,C1}$ may be set in the measurement subset C1.

Likewise, when corrections are set for respective measurement subsets, interference measurement of each subset (the subframe set C0, C1) of the UE may be performed as follows.

The UE may calculate CSI using remaining interference after cancelling CRSs of neighbor macro eNBs in the measurement subset C0, correct the CSI using a value $\Delta_{k,C0}$ that reflects actual interference therein, and report the corrected CSI to an eNB. CSI measurement of the measurement subset C0 of the UE may be performed by calculating CSI using remaining interference after cancelling CRSs of the neighbors macro eNBs, correct the CSI using a value $\Delta_{k,C1s}$ that reflects actual interference therein. Here, correction values $\Delta_{k,C0}$ and $\Delta_{k,C1}$ for reflection of actual interference represent interference characteristics, and thus, may differ according to measurement subsets, and in detail, may be represented as a ratio of PDSCH EPRE to CRS EPRE for the respective measurement subsets.

In particular, a correction value of a specific measurement subset used as normal subframes by neighbor cells may be 1 (a ratio of PDSCH EPRE to CRS EPRE in the normal subframe, $(\rho_A, \rho_B)$) and a correction value of a specific measurement subset used as an ABS by neighbor macro eNBs may be 0 (a ratio of PDSCH EPRE to CRS EPRE in a subframe in which a PDSCH is not scheduled. That is, $\Delta_{k,C0}$ may correspond to a ratio of PDSCH EPRE to CRS EPRE of a $k_{th}$ cell of the measurement subset C0, and $\Delta_{k,C1}$ may correspond to a ratio of PDSCH EPRE to CRS EPRE of a $k_{th}$ cell of the measurement subset C1.

$\Delta_{k,C0}$ and $\Delta_{k,C1}$ may be included in the aforementioned CRS information of the neighbor cell and transmitted to the UE. In this case, Table 5 below exemplarily shows CRS information elements of a neighbor cell.

TABLE 5

NeighborCellCRSInformation ::= CHOICE {
    Cell ID
    { number of CRS ports,
        frequency information of CRS transmission,
        time information of CRS transmission,
        delta_C0,
        delta_C1}
}

In Table 5 above, delta_C0 ($\Delta_{k,C0}$) corresponds to a ratio of PDSCH EPRE to CRS EPRE in a subframe set related to ABS by an eNB of a corresponding cell ID, and delta_C1 ($\Delta_{k,C1}$) corresponds to a ratio of PDSCH EPRE to CRS EPRE in a subframe set related to normal subframe by the eNB of the corresponding cell ID.

$\Delta_{k,C0}$ and $\Delta_{k,C1}$ may represent interference for each measurement subset and load information of neighbor cells, respectively, and may be transferred through higher-layer signaling.

For example, $\Delta_{k,C0}$ and $\Delta_{k,C1}$ may be 0 and 1, respectively. When $\Delta_{k,C0}=0$, $\Delta_{k,C0}$ represents interference when transmission power of neighbor cells is reduced (including a case in which PDSCH transmission power of neighbor cells is 0) to perform PDSCH scheduling. When $\Delta_{k,C0}=1$, $\Delta_{k,C0}$ represents interference when transmission power of neighbor cells is not reduced to perform PDSCH scheduling. In this measurement subset, CRS IC may not be performed in the colliding CRS case.

In this case, an ABS configuration flag as a signal indicating whether or not a corresponding cell collaboratively performs ABS configuration with a serving cell for each cell ID may be signaled in a NeighborCellCRSInformation message for transmission of CRS information of a neighbor cell.

TABLE 6

NeighborCellCRSInformation ::= CHOICE {
    Cell ID
    { number of CRS ports,
        frequency information of CRS transmission,
        time information of CRS transmission,
        ABS configuration flag}
}

With regard to a cell ID in which the ABS configuration flag is set, when CRS of the corresponding cell collides with CRS of the serving cell, the CRS of the corresponding cell is canceled in the measurement subframe subset C0, and then, interference from the corresponding cell is corrected using $\Delta_{k,C0}$, for example, $\Delta_{k,C0}=0$. With regard to a cell ID in which the ABS configuration flag is not set, when CRS of the corresponding cell collides with CRS of the serving cell, the CRS of the corresponding cell is not canceled in the measurement subframe subset C0, or even though the CRS of the corresponding cell is canceled, a next corrected value cannot be 0, and the value may be, for example, $\Delta_{k,C0}=1$. This is because there is a possibility that the corresponding cell does not configure ABS in the measurement subframe subset C0 (subframe set of which ABS is used by neighbor macro eNBs).

Likewise, when a separate ABS configuration flag is signaled, an interference correction value may be determined according to the ABS configuration flag.

That is, when an ABS configuration flag is set to '0' with respect to a specific cell (when the corresponding cell does not collaborate with the serving cell using ABS), $\Delta_{k,C0}=\Delta_{k,C1}$ is satisfied as a correction value of the corresponding cell, and the correction value may be shared by measurement subframes. In this case, CRS IC of the corresponding cell is particularly meaningless in all measurement subframe subsets. Thus, when an UE calculates CSI, CRS IC or separate interference mitigation schemes may not be used in the corresponding cell.

On the other hand, when an ABS configuration flag is set to '1' with respect to a specific cell (when the corresponding cell collaborates with the serving cell using ABS), the interference correction value of the corresponding cell may have an independent value for each measurement subframe subset. In addition, with regard to such a cell, in a subframe set used as a normal subframe for PDSCH scheduling without reducing transmission power by the corresponding cell, that is, in the measurement subframe C1, interference may be measured without CRS IC of the corresponding cell. In this case, the UE may assume the interference correction value $\Delta_{k,C1}$ in the measurement subframe subset C1 as 1 (i.e., a ratio of PDSCH EPRE to CRS EPRE=1) without separate signaling. On the other hand, only the interference correction value $\Delta_{k,C0}$ of the measurement subframe subset C0 may be signaled to the UE.

Figure 11:
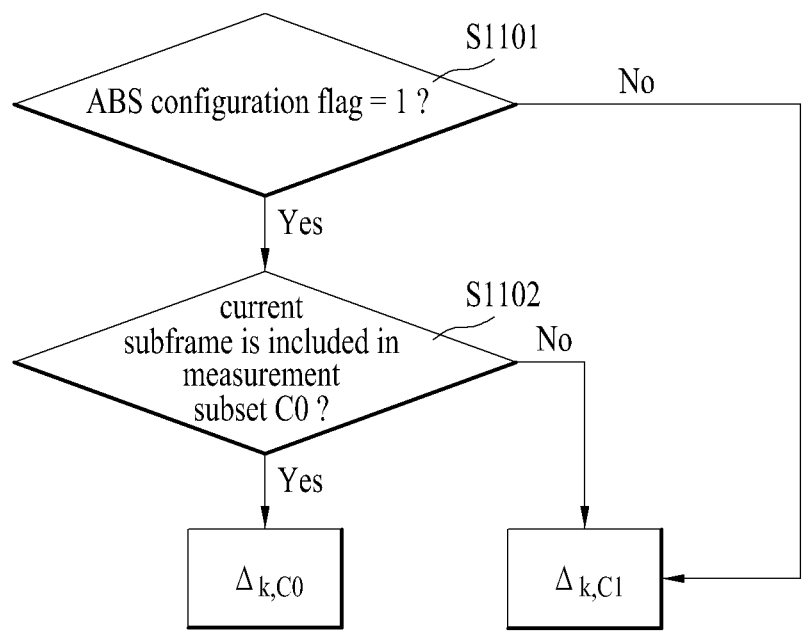
FIG. 11 is a flowchart illustrating determination of a correction value according to an embodiment of the present invention.

When both the aforementioned ABS configuration flag and correction value for each the measurement subset are signaled to the UE, the correction value may be determined as shown in FIG. 11. Referring to FIG. 11, the UE checks a value of the ABS configuration flag in operation S1101. When the value of the ABS configuration flag is 1, the UE determines which of measurement subsets C0 and C1 is a subset to which a current subframe belongs in operation S1102. In other words, the UE determines whether the current subframe belongs to the measurement subset C0. When the current subframe belongs to the measurement subset C0, the UE may determine the correction value as $\Delta_{k,C0}$. When the current subframe belong to the measurement subframe C1, the UE may determine the correction value as $\Delta_{k,C1}$. When the ABS configuration flag is not 1, the UE may determine the correction value as $\Delta_{k,C1}$ with regard to all measurement subsets.

As described above, a ratio of PDSCH EPRE to CRS EPRE of each cell in which CRS IC needs to be performed is signaled to the UE, the UE may cancel CRS of a specific cell in the colliding CRS case, and then the UE may correct actual interference using the ratio of PDSCH EPRE to CRS EPRE of the specific cell. However, in consideration of signaling overhead, an average interference correction value for each measurement subset may be signaled for CSI measurement of the UE. The UE may perform CRS IC according to the average interference correction value, and correct the actual interference using different values for respective measurement subsets to calculate CSI.

That is, Expression 2 and 3 above may be approximated by Expression 4 below.

$$I = I_0 + I_{N\_CRS} \quad \text{[Expression 4]}$$
$$\approx I_0 + \Delta \cdot \sum_k I_{N\_CRS,k}$$
$$= I_0 + \Delta \cdot I_{N\_CRS}$$

As seen from Expression 4 above, $\Delta = \Delta_{C0}$ may be satisfied in the measurement subset C0 and $\Delta = \Delta_{C1}$ may be satisfied in the measurement subset C1. $\Delta_{C0}$ is a representative value for correction of interference from cells having colliding CRS positions with serving cell, in the measurement subset C0, and $\Delta_{C1}$ is a representative value for correction of interference from cells having CRS positions with serving cell, in the measurement subset C1.

When a correction value is not explicitly signaled, the UE may calculate CSI under an assumption that a ratio of PDSCH EPRE to CRS EPRE of a neighbor cell is 1 (i.e., PDSCH EPRE=CRS EPRE) in order to measure CSI in a subframe set used as a normal subframe by a neighbor macro eNB.

The UE may assume that a ratio of PDSCH EPRE to CRS EPRE for each measurement subframe subset of a serving cell of the UE is also applied to neighbor cells. In particular, in this case, as another method of calculating neighbor interference, the UE may not calculate interference by performing CRS IC and may calculate CSI based on remaining interference after cancelling CRS of a serving cell. In this case, separate operations and signaling for interference correction may not be required.

The UE may measure interference without CRS IC, perform CRS IC of corresponding cells in only subframe sets of which ABS is used by neighbor macro eNBs, and correct actual interference using separate value ($\Delta$) to calculate CQI in order to measure CSI in a subframe set used as a normal subframe by the neighbor macro eNBs.

In addition, the UE may measure a ratio of PDSCH EPRE to CRS EPRE of a neighbor cell without signaling the correction value $\Delta_k$ to calculate interference. That is, when power measured in an OFDM symbol that does not contain CRS is smaller than power of an OFDM containing CRS by a predetermined level or more, the UE needs to assume that the corresponding cell uses ABS, to cancel CRS of the corresponding cell, and then, to measure interference. On the other hand, when the measured power is maintained at a similar level, the UE may calculate CQI without cancellation of CRS of the corresponding cell.

The above description has been given under an assumption that the UE has a pico eNB as a serving cell. However, when the UE receives a service from a macro eNB, the aforementioned operations and signaling are also required. When a plurality of measurement subsets are set for CSI calculation of a macro UE in the colliding CRS case, interference correction and signal correction need to be simultaneously performed for CSI calculation. That is, in a network in which a macro eNB collaboratively configure ABS, when a measurement subset representing interference characteristics is set to the macro eNB, the UE may perform interference/signal correction for each measurement subset for CSI calculation after CRS IC of a neighbor cell. For example, when two measurement subsets C0 and C1 are configured (C0 corresponds to a subframe used as ABS by macro eNBs containing a serving cell of the UE, and C1 corresponds to a subframe used as a normal subframe by neighbor macro eNBs containing the serving cell), and PDSCH transmission power of the serving cell is reduced in C0, interference level is reduced according to the same operation of the neighbor macro eNBs.

Remaining interference after CRS interference of neighbor cells is cancelled is corrected using value $\Delta_{C0}$ that reflects actual interference therein, and a serving cell signal is corrected based on a ratio of PDSCH EPRE to CRS EPRE of the serving cell in the measurement subset C0 after CRS measurement of the serving cell to calculate CSI. For CSI measurement in the measurement subset C1, the UE corrects remaining interference after CRS interference cancellation of a neighbor cell using value $\Delta_{C1}$ that reflects actual interference therein. However, CRS cancellation for CSI measurement in a measurement subframe subset related to normal subframes may be particularly meaningless. For more accurate interference measurement, when the UE calculates CSI based on remaining interference after CRS of a serving cell is cancelled, the accuracy of interference measurement may be increased while reducing calculation complexity.

The case in which the UE does not perform CRS IC has been described, which may be explicitly signaled. In more detail, when the UE calculates CSI, the UE may signal an interference suppress flag indicating whether or not CRS IC is performed to each measurement subset.

The interference suppress flag may be determined according to the number of measurement subsets. For example, when the number of measurement subsets is two, the measurement subsets may be represented by two bits {b1, b2}. Here, b1 may indicate whether or not CRS IC of a corresponding cell is allowed in the measurement subset C0, and b2 may indicate whether or not CRS IC of a corresponding cell is allowed in the measurement subset C1. An example of this case is shown in Table 7 below.

TABLE 7

| Interference suppress flag | interpretation |
|---|---|
| 00 | CRS IC is not allowed in measurement subset C0 and C1 |
| 01 | CRS IC is not allowed in measurement subset C0 CRS IC is allowed in measurement subset C1 |
| 10 | CRS IC is allowed in measurement subset C0 CRS IC is not allowed in measurement subset C1 |
| 11 | CRS IC is not allowed in measurement subset C0 CRS IC is not allowed in measurement subset C1 |

When the number of measurement subsets is two and the interference suppress flag includes only one bit, the interference suppress flag may be set to indicate whether or not CRS IC of the corresponding cell is allowed in the measurement subset C1. In more detail, when the measurement subset C0 is related to ABS and the measurement subset C1 is related to a normal frame, default CRS IC may be performed in the measurement subset C0 and whether or not CRS IC is allowed in the measurement subset C1 may be indicated through the interference suppress flag.

Hereinafter, rate matching of a CRS interference handling method at a transmission side will be described.

An eNB may perform rate matching on a resource region corresponding to CRS of a neighbor cell in a PDSCH region based on CRS information of neighbor cells of the eNB. The eNB may transmit a message to a UE in the form of NeighborCellCRSInformation. Based on the NeighborCellCRSInformation message, the UE may recognize that PDSCH of a serving cell of the UE is to be rate-matched. In this case, the eNB may indicate a position of the resource region of REs to be rate-matched as subframe information containing a cell ID of each neighbor cell, the number of CRS ports, and CRS of a neighbor cell.

As another example, the eNB may transmit an indicator indicating whether or not serving cell data is mapped to positions of all CRSs of a neighbor cell indicated by the NeighborCellCRSInformation message such that the UE may perform a corresponding data restoration operation.

As another example, the eNB may inform the UE about a position of the PDSCH to be actually rate-matched, using a separate indicator of the NeighborCellCRSInformation message. That is, the UE receiving CRS information of a neighbor cell may perform CRS IC, puncturing, or the like using the NeighborCellCRSInformation message according to receiver capability of the UE. On the other hand, the eNB may inform the UE of a cell of which CRS is rate-matched using the separate indicator and prevent CRS interference from a specific cell by perform rate matching a specific RE during PDSCH reception. In this case, the separate indicator may be a cell ID list of cells in which rate matching is performed by the eNB during PDSCH mapping.

As another example, a rate matching flag may be added to the NeighborCellCRSInformation message for indicating rate matched CRS position in PDSCH of a serving cell. The rate matching flag may indicate a CRS position of a specific cell in which PDSCH is rate matched. In this case, the UE may perform an interference mitigation scheme such as interference cancellation of a reception side on only CRSs of cells in which the rate matching flag is not set. The rate matching flag may be contained in NeighborCellCRSInformation exemplarily shown in Table 8 below and transferred through higher layer signaling.

TABLE 8

```
NeighborCellCRSInformation ::=     CHOICE {
    cell ID
    { number of CRS ports,
      freqrency information of CRS transmission,
      time information of CRS transmission,
      rate matching flag}
}
```

Figure 12:
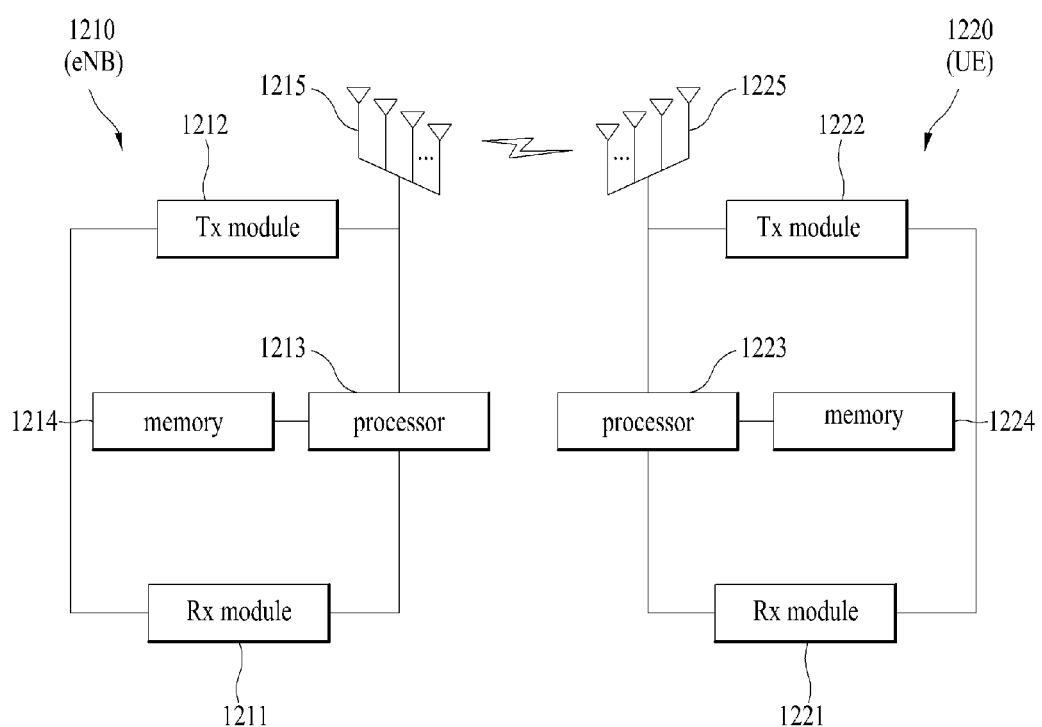
FIG. 12 is a block diagram of a transmission point apparatus and a user equipment (UE) apparatus.

FIG. 12 is a block diagram illustrating a transmission point apparatus and a UE apparatus according to embodiments of the present invention.

Referring to FIG. 12, the transmission point apparatus 1210 according to the present invention may include a reception (Rx) module 1211, a transmission (Tx) module 1212, a processor 1213, a memory 1214, and a plurality of antennas 1215. The plurality of antennas 1215 indicates a transmission point apparatus for supporting MIMO transmission and reception. The reception (Rx) module 1211 may receive a variety of signals, data and information on an uplink starting from the UE. The Tx module 1212 may transmit a variety of signals, data and information on a downlink for the UE. The processor 1213 may provide overall control to the transmission point apparatus 1210.

The processor 1213 of the transmission point apparatus 1210 according to one embodiment of the present invention can process the above-mentioned embodiments.

The processor 1213 of the transmission point apparatus 1210 processes information received at the transmission point apparatus 1210 and transmission information to be transmitted externally. The memory 1214 may store the processed information for a predetermined time. The memory 1214 may be replaced with a component such as a buffer (not shown).

Referring to FIG. 12, the UE apparatus 1220 may include an Rx module 1221, a Tx module 1222, a processor 1223, a memory 1224, and a plurality of antennas 1225. The plurality of antennas 1225 indicates a UE apparatus supporting MIMO transmission and reception. The Rx module 1221 may receive downlink signals, data and information from the BS (eNB). The Tx module 1222 may transmit uplink signals, data and information to the BS (eNB). The processor 1223 may provide overall control to the UE apparatus 1220.

The processor 1223 of the UE apparatus 1220 according to one embodiment of the present invention can process the above-mentioned embodiments.

The processor 1223 of the UE apparatus 1220 processes information received at the UE apparatus 1220 and transmission information to be transmitted externally. The memory 1224 may store the processed information for a predetermined time. The memory 1224 may be replaced with a component such as a buffer (not shown).

The specific configurations of the transmission point apparatus and the UE apparatus may be implemented such that the various embodiments of the present invention are performed independently or two or more embodiments of the present invention are performed simultaneously. Redundant matters will not be described herein for clarity.

The description of the transmission point apparatus 1210 shown in FIG. 12 may be applied to the eNB (BS), or may also be applied to a relay node (RN) acting as a DL transmission entity or UL reception entity without departing from the scope or spirit of the present invention. In addition, the description of the UE apparatus 1220 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

MODE FOR INVENTION

Various embodiments have been described in the best mode for carrying out the invention.

INDUSTRIAL APPLICABILITY

The embodiments of the present invention can be applied to a variety of mobile communication systems.

The invention claimed is:

1. A method of measuring interference by a User Equipment (UE) in a wireless communication system, the method comprising:
   receiving Cell Specific Reference Signal (CRS) information of a neighbor cell, the CRS information comprising an ABS configuration flag which indicates whether or not the neighbor cell is a collaborative cell of a serving cell of the UE;
   performing CRS interference cancellation based on the CRS information; and
   applying a correction value to a result obtained by performing the CRS interference cancellation to measure interference,
   wherein the correction value is set for each subframe set for restricted measurement.

2. The method according to claim 1, wherein the correction value is a ratio of Physical Downlink Shared Channel (PDSCH) Energy per Resource Element (EPRE) to CRS EPRE.

3. The method according to claim 1, wherein a subframe set for the restricted measurement comprises a first subframe set for Almost Blank Subframe (ABS) and a second subframe set for a normal subframe, and
   wherein the correction value comprises a first correction value for the first subframe set and a second correction value for the second subframe set.

4. The method according to claim 3, wherein the first correction value is 0 and the second correction value is 1.

5. The method according to claim 3, wherein the UE assumes that the second correction value is equal to the ratio of PDSCH EPRE to CRS EPRE of a serving cell of the UE.

6. The method according to claim 1, wherein the correction value is contained in the CRS information and transmitted to the UE.

7. The method according to claim 1, wherein the ABS configuration flag indicates ABS configuration is shared by the neighbor cell and the serving cell of the UE when the ABS configuration flag is 1, and the ABS configuration flag indicates that the neighbor cell is not related to ABS configuration of the serving cell of the UE when the ABS configuration flag is 0.

8. The method according to claim 1, wherein correction values for each subframe are identical, when the ABS configuration flag is 0.

9. The method according to claim 1, wherein a correction value for a subframe set related to ABS is 0 and a correction value for a subframe set related to a normal frame is 1, when the ABS configuration flag is 1.

10. The method according to claim 1, wherein the CRS information includes at least one of a cell identity (ID), the number of CRS ports, information of a frequency for transmission of CRS, and information of time for transmission of CRS.

11. The method according to claim 1, wherein the CRS information is transferred as higher layer signaling.

12. A User Equipment (UE) in a wireless communication system, the UE comprising:
   a reception module; and
   a processor,
   wherein the processor receives Cell Specific Reference Signal (CRS) information of a neighbor cell, performs CRS interference cancellation based on the CRS information, and applies a correction value to a result obtained by performing the CRS interference cancellation to measure interference, and wherein the CRS information comprises an ABS configuration flag which indicates whether or not the neighbor cell is a collaborative cell of a serving cell of the UE
wherein the correction value is set for each subframe set for restricted measurement.

* * * * *